3,463,337
WHEEL ASSEMBLY SUPPORTING AND
POSITIONING CART
Frank Reznicek, 1412 7th St.,
Columbus, Nebr. 68601
Filed Sept. 28, 1967, Ser. No. 671,474
Int. Cl. B60b 29/00; B65g 7/00
U.S. Cl. 214—332                    4 Claims

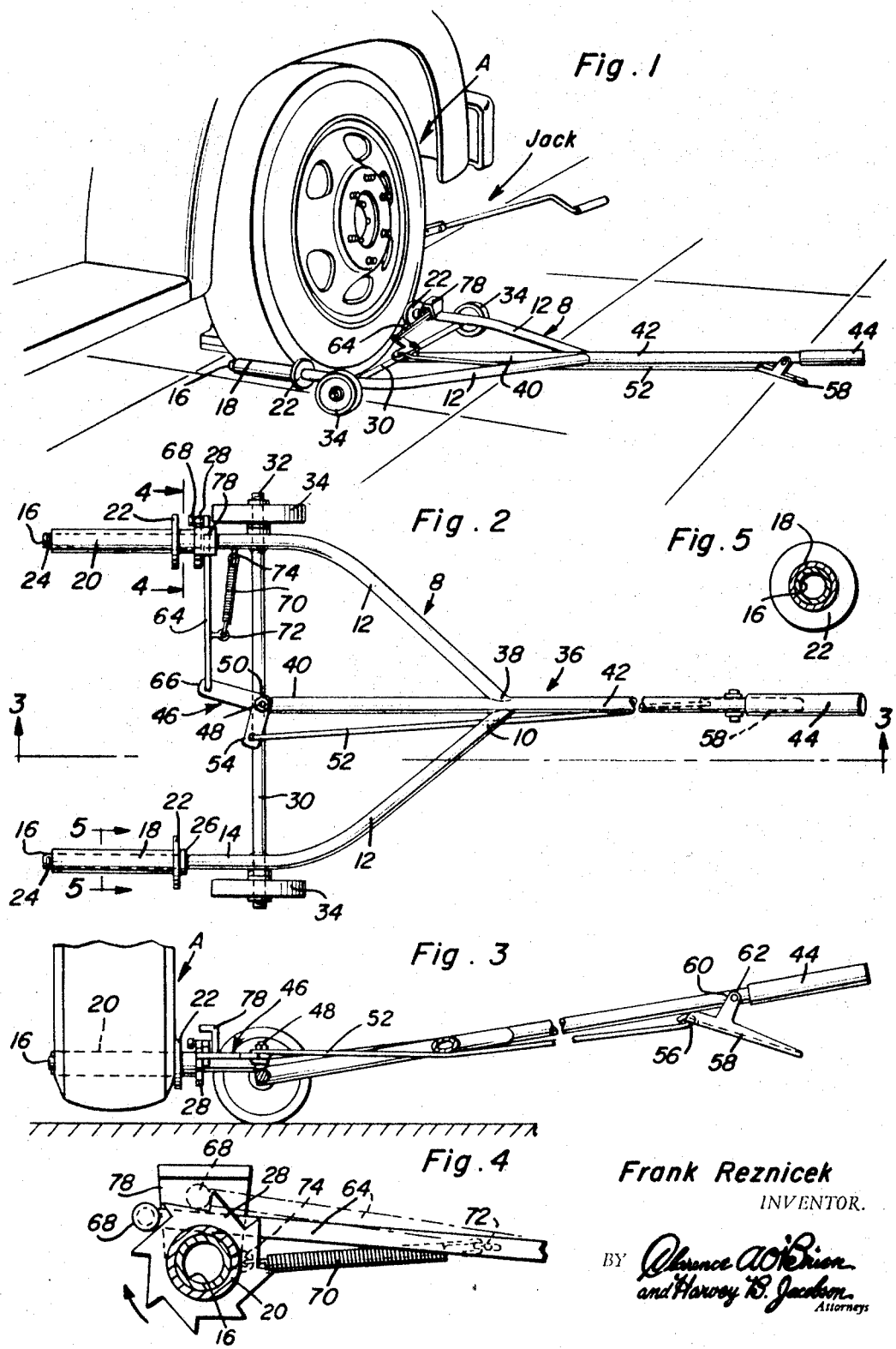

ABSTRACT OF THE DISCLOSURE

The cart shown can be handled by one workman. A wheel supported yoke-type frame can be maneuvered to lift, support and cradle a heavy duty vehicle wheel assembly. The balanced handle not only handles the cart, it carries a trip lever which transmits motion to a bellcrank on the wheel-equipped shaft. The bellcrank actuates pawl and ratchet means which in turn revolves one of a pair of vehicle wheel cradling rollers on the frame. Accordingly, the vehicle wheel can be cradled and carted into a ready-to-mount position where the stud holes can be correctly lined up and shoved into place, whereupon the usual nuts can be applied and tightened.

---

The present invention relates to certain new and useful improvements in a special purpose hand truck which is expressly designed and adapted to transport, maneuver and handle heavy duty vehicle wheel assemblies, more particularly a rim-equipped disk and a pneumatic tire of a type wherein the disk is provided at its hub portion with stud holes to accommodate mounting and retaining studs.

Persons conversant with the art to which the invention relates are aware that it is old in the art to provide a tire and wheel dolly wherein a handle-equipped frame structure makes it possible for a single workman to lift, position and line up a wheel disk with wheel mounting studs. One such adaptation is shown in a typical patent to Huff, 2,546,509. Another wheel and tire lifter and maneuvering truck is shown in a prior patent to Burch, 2,613,084, and which, generally speaking, is characterized by certain of the features found in the invention herein disclosed. The fact that prior art supporting, maneuvering and lifting and lowering trucks have not met with widespread adoption and use can be taken to reveal the fact that the problem still exists. It follows that it is an objective in the instant matter to advance the art and, in so doing, to provide a simple, practical and easy-to-use cart which will be approved, it is believed, by manufacturers, will be indorsed by retailers of automotive equipment, and will meet the needs of users, particularly mechanics in service garages and the like.

Briefly a preferred embodiment of the invention and which is shown herein is characterized by a mobile frame whose leading end embodies a yoke. This yoke has spaced arms which terminate in straight parallel coplanar extensions, more particularly, spindle-like portions which consitute a pair of companion roller journaling axles. A stabilizing shaft spans corresponding median portions of the yoke arms. This shaft is spaced rearwardly from the forward ends of the axles and has end portions fixed to the arms with the terminal ends thereof projecting slightly beyond the arms to accommodatingly support free turning load handling and carting wheels. A single centralized handle provides for balanced control of the wheel supported frame and permits the user to manuever the cart and to lift and lower the same with the vehicle wheel cradled between the rollers. And, too, the median portion of the handle is not only joined to the crotch portion of the yoke but extends therebeyond and terminates in a hand grip. The aforementioned rollers constitute simple sleeves which are mounted for rotation on the axles and provide the desired supporting, transporting and aligning rollers.

More particularly, novelty is predicated on the construction and arrangement above briefly set forth and on means which is carried by the cart, said means comprising a bellcrank which operates pawl and ratchet means capable of turning one of the rollers. To the ends desired, the bellcrank is actuated by a push-pull link which in turn is controlled by a trippable lever on the aforementioned handle adjacent the hand grip.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a wheel assembly supporting and positioning cart and how it is constructed and used, that is, after the vehicle axle has been jacked up.

FIG. 2 is a top plan view of the cart by itself.

FIG. 3 is a section taken approximately on the plane of the section line 3—3 of FIG. 2.

FIG. 4 is an enlarged detail section taken on the plane of the section line 4—4 of FIG. 2.

FIG. 5 is a suitably enlarged cross-section taken on the section line 5—5 of FIG. 2.

The aforementioned frame means is preferably but not necessarily made of hollow tubing or tubular rod members of the type shown. The leading end portion comprises a yoke denoted at 8 and embodying a pair of coplanar companion arms converging rearwardly to a crotch portion 10. The converging arm portions 12 have forward straight end portions 14 the free ends of which are fashioned into appropriate spindle-like journals 16. These journals are provided with roller sleeves one of which is denoted at 18 and the other one at 20, said sleeves being provided at their rearward ends with enlarged limit stop flanges 22. The outer ends of the sleeves are held in place by cotter keys or the like 24. A shoulder flange 26 is provided as shown in FIG. 2 and serves to properly position the roller or sleeve 18. The sleeve 20 is slightly longer than the sleeve 18 and the rearward end is provided with a properly toothed ratchet wheel 28 which serves in a manner to be hereinafter described.

Continuing now with component parts of the frame means it will be noted that a stabilizing rod is provided at 30 and spans the space between the yoke arms and is rigidly fixed in place and constitutes a shaft. The end portions 32 of the shaft project beyond the yoke arms and have free turning surface engaging and transporting wheels 34 mounted thereon. The aforementioned balanced handle is denoted at 36 and has a median portion 38 integrally joined with the crotch portion of the yoke, The forward end portion 40 is joined with a center portion of the shaft 30. The rearward end portion of the handle 42 is provided with an appropriate hand grip 44.

Means is provided on this cart to positively transmit movement to the aforementioned supporting and cradling roller 20. The means shown comprises a bellcrank 46 which is mounted for rotation on an upstanding stud 48 which is carried by the forward end portion of the handle and is provided with an assembling and retaining nut 50. A push-pull rod or link 52 is connected at one end to one arm 54 of the bellcrank. The other end of the link is connected as at 56 to a trip lever 58. The trip lever is provided with ears 60 hingedly mounted at 62 on the handle. The trip lever is positioned immediately below the hand grip and by catching hold of the hand grip with one hand it is also convenient to catch hold of the trip lever, this in a manner to rock the lever and move or operate the link 52. With further reference to the pawl and ratchet means it will be seen that a rod 64 provides an auxiliary link which is pivotally connected to an arm 66 of the bellcrank. The outer end of this auxiliary link is provided with a lateral headed terminal or extension 68 which provides a satisfactory pawl and which is engageable in a step-by-step manner with the teeth of the ratchet wheel 28 in a manner which is believed to be evident in full and phantom lines in FIG. 4. This auxiliary link is provided with a coil spring 70 which is attached to an eye screw 72 at one end and is anchored at 74 on one of the yoke arms as brought out in FIG. 2. The numeral 78 designates a substantially L-shaped guard which is fixed on the yoke arm and cooperates with the pawl and ratchet means to insure safe and controlled operation of the same as is evident in FIG. 4.

It is clear that this unique cart which has now been constructed and experimentally and satisfactorily used well serves the purposes for which it is intended.

In practice the spaced parallel rollers 18 and 20 serve to support and cradle the wheel assembly A in the manner shown in FIG. 1. The flanges 22 at the rearward ends of the rollers facilitate placement of the tire and assist in maintaining the wheel in a substantially correct and erect position. With training and experience a single workman can be taught to handle and maneuver this cart, can position the wheel A temporarily or initially in place, can tilt the handle of the cart down, can lift the wheel up and when it is in substantially correct position, he can then bring into play the pawl and ratchet remote control means and revolve the wheel until the stud holes in the disk are properly lined up with the studs. The then properly aligned wheel can be pushed into place and fastened in a self-evident manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. For ready handling and maneuverable use by a single workman, a vehicle wheel assembly transporting, cradling, and positioning cart comprising: manually controllable mobile frame means having a leading end embodying a yoke having spaced arms terminating at forward ends in straight parallel coplanar spindle-like portions constituting roller journaling axles, a stabilizing shaft at right angles to and spanning corresponding median portions of said arms, said shaft being spaced rearwardly from the forward terminal ends of said axles, being fixed to said arms and having terminal ends projecting beyond said arms and provided with opposed free turning vehicle wheel assembly locating and aligning wheels, a single balancing and maneuvering handle centrally located and having a forward end fixed to a median portion of said shaft and a median portion thereof joined to a rearward crotch portion of said yoke and extending therebeyond and terminating in a hand-grip, like cylindrical sleeves journaled for free rotation on their respective axles and providing load cradling and turning rollers, said sleeves provided at rearward ends with enlarged outstanding flanges providing limit stop abutments and having the capability of locating, righting and assisting in supportively cradling the vehicle wheel assembly in an oriented upright ready-to-mount position atop said rollers, self-contained means carried by said cart and serving, when actuated by the user of the cart, to positively rotate at least one of said rollers, whereby to rotate the wheel assembly in a manner to register the usual stud holes in the rim disk thereof with usual studs on the hub of the vehicle, said means comprising a bellcrank pivotally mounted above a central portion of said shaft and a forward end portion of said handle, a trip lever pivoted on said handle adjacent said hand-grip, a push-pull link extending alongside said handle and operatively joining said trip lever with a coacting arm of said bellcrank, and an operating connection between the other arm of said bellcrank and said one roller.

2. The cart defined in and according to claim 1, and wherein said operating connection is characterized by pawl and ratchet means coacting with said one roller.

3. A wheel assembly supporting and positioning cart comprising a frame structure embodying a leading end portion including a yoke having a pair of spaced arms terminating in straight parallel coplanar portions constituting a pair of companion wheel journaling axles, a rigidifying shaft disposed at right angles to and spanning the space between corresponding median portions of said arms, said shaft being spaced rearwardly from forward end portions of said axles, having end portions fixed to the respectively cooperable arms and having terminal ends projecting outwardly and beyond said arms, surface contacting and carting wheels mounted for free rotation on said terminal ends, a single centrally located balancing and maneuvering handle having a forward end fixed to a median portion of said shaft and a median portion joined to a rearward crotch portion of said yoke and extending beyond said crotch portion and terminating in a handgrip, sleeves journaled for rotation on their respective axles and providing load cradling and turning rollers, said rollers having rearward end portions provided with integral outstanding flanges capable of abutting and assisting in maintaining and cradling the wheel assembly in an upright maneuverable position, remote controlled pawl and ratchet mechanism operatively cooperable with a cooperating end portion of at least one of said rollers, a bellcrank pivotally mounted above and in general alignment with a centralized portion of said shaft, a manually actuable trip lever pivoted on said handle adjacent a handgrip provided on said handle, a push-pull link operatively joining said trip lever with an arm of said bellcrank, and a linking and operating connection between the other arm of said bellcrank and coacting part of said pawl and ratchet mechanism.

4. The wheel assembly supporting and positioning cart defined in and according to claim 3, and wherein said yoke arms are positioned atop and fixed on underneath end portions of said shaft, said push-pull link being of a length generally commensurate with the overall length of said handle, said operating connection comprising a rod, said rod providing an auxiliary link, and a coil spring having one end anchored on a median portion of said rod and a coordinating portion anchored on an adjacent one of said arms.

References Cited

UNITED STATES PATENTS

| 1,892,979 | 1/1933 | Clark | 214—332 |
| 2,364,918 | 12/1944 | Roberson | 214—331 |
| 2,381,563 | 8/1945 | Switzer | 294—21 |
| 2,512,450 | 6/1950 | Williams | 74—142 |
| 3,069,195 | 12/1962 | Buck | 294—21 |

GERALD M. FORLENZA, Primary Examiner

U.S. Cl. X.R.

214—340